United States Patent
Lee et al.

(10) Patent No.: US 12,006,970 B2
(45) Date of Patent: Jun. 11, 2024

(54) BALL RETAINER

(71) Applicant: TBI MOTION TECHNOLOGY CO., LTD., New Taipei (TW)

(72) Inventors: Ching-Sheng Lee, New Taipei (TW); Tien-Chang Wu, New Taipei (TW)

(73) Assignee: TBI MOTION TECHNOLOGY CO., LTD., New Taipei (TW)

( * ) Notice: Subject to any disclaimer, the term of this patent is extended or adjusted under 35 U.S.C. 154(b) by 566 days.

(21) Appl. No.: 17/444,634

(22) Filed: Aug. 6, 2021

(65) Prior Publication Data
US 2022/0056947 A1 Feb. 24, 2022

(30) Foreign Application Priority Data
Aug. 21, 2020 (CN) .......................... 202021760364.7

(51) Int. Cl.
*F16C 11/06* (2006.01)

(52) U.S. Cl.
CPC ................................ *F16C 11/0695* (2013.01)

(58) Field of Classification Search
CPC ..... B65G 17/08; B65G 17/38; F16C 11/0695; F16G 13/04; F16G 13/07; F16G 13/14; A44C 11/00; A44C 5/209; A44D 2201/04; A44D 2201/12; A44D 2201/14; A44D 2201/16
See application file for complete search history.

(56) References Cited

U.S. PATENT DOCUMENTS

| | | | | |
|---|---|---|---|---|
| 564,030 | A | * | 7/1896 | Schwartz, Jr. .......... F16G 13/07 474/234 |
| 1,098,597 | A | * | 6/1914 | Taylor ..................... F16G 13/14 59/84 |
| 1,759,488 | A | * | 5/1930 | Marshall ................. F16G 13/12 59/78 |
| 2,539,891 | A | * | 1/1951 | Carr ....................... A44C 5/102 59/900 |
| 2,695,095 | A | * | 11/1954 | Anderson ............... F16G 13/07 198/850 |

(Continued)

FOREIGN PATENT DOCUMENTS

| JP | H11294452 A | 10/1999 |
|---|---|---|
| JP | H11351255 A | 12/1999 |

(Continued)

*Primary Examiner* — Daniel J Wiley
(74) *Attorney, Agent, or Firm* — INNOVATION CAPITAL LAW GROUP, LLP; Vic Lin

(57) ABSTRACT

A ball retainer is provided. The ball retainer includes a chain belt, a hook portion, and a recess portion. The chain belt has a first end and a second end. The hook portion is disposed at the first end. The recess portion is disposed at the second end. An outer circumferential side and an inner circumferential side are formed after the hook portion of the ball retainer is snapped into the recess portion. During operation of the ball retainer after the hook portion is snapped into the recess portion, an acting force is applied to the chain belt so that the hook portion is disengaged from the recess portion. During operation of the ball retainer after the acting force disappears, the first end and the second end of the chain belt approach each other so that the hook portion is accordingly snapped into the recess portion.

10 Claims, 7 Drawing Sheets

(56) References Cited

U.S. PATENT DOCUMENTS

| | | | | |
|---|---|---|---|---|
| 2,766,635 | A * | 10/1956 | Schwarzkopf | F16G 13/02 198/850 |
| 3,069,923 | A * | 12/1962 | Lengyel | F16G 13/07 474/212 |
| 3,095,753 | A * | 7/1963 | Lengyel | F16G 13/07 474/212 |
| 3,415,136 | A * | 12/1968 | Mojonnier | F16G 13/07 474/212 |
| 4,030,287 | A * | 6/1977 | Magnin | A44C 5/102 59/85 |
| 4,815,270 | A * | 3/1989 | Lapeyre | F16G 13/07 59/900 |
| 4,882,901 | A * | 11/1989 | Lapeyre | B65G 17/08 59/900 |
| 5,009,630 | A * | 4/1991 | Kanehira | F16G 13/07 474/227 |
| 9,622,553 | B2 * | 4/2017 | Lauren | A44C 11/00 |
| 2007/0065055 | A1 | 3/2007 | Pan | |
| 2016/0192745 | A1 * | 7/2016 | Lauren | A44C 5/105 59/89 |

FOREIGN PATENT DOCUMENTS

| | | | |
|---|---|---|---|
| JP | 2007187200 A | | 7/2007 |
| JP | 2013145039 A | | 7/2013 |
| WO | 2007013369 A1 | | 2/2007 |

* cited by examiner

BALL RETAINER

CROSS-REFERENCE TO RELATED APPLICATION

This non-provisional application claims priority under 35 U.S.C. § 119(a) to Patent Application No. 202021760364.7 filed in China, P.R.C. on Aug. 21, 2020, the entire contents of which are hereby incorporated by reference.

BACKGROUND

Technical Field

The present invention relates to a ball retainer, and in particular, to a ball retainer having a hook-like structure at an end.

Related Art

A traditional retainer has ends unconnected. Therefore, when a transmission element is under a load, a load capacity is significantly reduced. After years of development, a retainer having an end-to-end connected chain belt structure emerges. An existing transmission element has many connection types, such as a bolt connection, a concave-convex piece connection, a ball joint connection, and the like.

However, the end-to-end connected chain belt formed by using the foregoing structure has much less flexibility at a joint. As a result, at a circular turning point or a place where the traveling is slightly unsmooth, the transmission element cannot operate, or the joint may crack and elements may fall off, affecting operation of other elements.

SUMMARY

In view of the above, the present invention provides a ball retainer in an embodiment, including a chain belt, a hook portion, and a recess portion. The chain belt has a first end and a second end respectively located at two opposite end portions and a plurality of accommodation portions between the first end and the second end. Each of the accommodation portions is configured to accommodate a ball. The hook portion is disposed at the first end of the chain belt. The recess portion is disposed at the second end of the chain belt corresponding to the hook portion. An outer circumferential side and an inner circumferential side are formed after the hook portion of the ball retainer is snapped into the recess portion. The hook portion extends toward the outer circumferential side, and the recess portion extends toward the inner circumferential side. When an acting force is applied to the chain belt during operation of the ball retainer such that the first end and the second end are moved away from each other after the hook portion is snapped into the recess portion, the hook portion is disengaged from the recess portion. During operation of the ball retainer after the acting force disappears, the first end and the second end of the chain belt approach each other so that the hook portion is accordingly snapped into the recess portion.

In some embodiments, the recess portion has a groove and an abutting portion. After the hook portion is snapped into the recess portion, the abutting portion is correspondingly disposed on the outer circumferential side of the second connecting section of the hook portion and abuts against a first connecting section, and the first connecting section is accommodated in the groove.

In some embodiments, the hook portion has the first connecting section and a second connecting section. The second connecting section connects the first end of the chain belt to the first connecting section, and a side of the first connecting section away from the second connecting section has an inclined plane.

In some embodiments, the second connecting section has an amount of elastic deformation. When an acting force is applied to the chain belt so that the first end and the second end are moved away from each other after the hook portion is snapped into the recess portion, the second connecting section is elastically deformed, so that the hook portion is disengaged from the recess portion.

In some embodiments, the hook portion is deformed to be disengaged from the recess portion.

In some embodiments, a joint between the recess portion and the chain belt is deformed, so that the hook portion is disengaged from the recess portion.

In some embodiments, the ball retainer further includes a plurality of hook portions disposed between the hook portion and the chain belt. One of the hook portions and the hook portion is snapped into the recess portion.

In some embodiments, the ball retainer further includes a plurality of additional recess portions disposed between the recess portion and the chain belt. The hook portion is snapped into the recess portion or one of the additional recess portions.

In some embodiments, the ball retainer is made of plastic.

In conclusion, according to the ball retainer provided in the present invention, by means of the hook-like structure disposed at the end of the chain belt, the hook portion is disengaged from the recess portion at a turning point or a place where the traveling is slightly unsmooth, which can not only prevent the hook portion and the recess portion from cracking at a joint with the chain belt, but also improve flexibility of the joint. In addition, when a transmission element operates smoothly since the disengagement, the hook portion may be accordingly snapped into the recess portion again to restore to an initial connection status, so as to drive the whole ball retainer to operate smoothly. In this way, an overall load capacity can be improved, damage caused by an excessive acting force or obstruction can be avoided, unsmooth operation that may occur at a turning point can also be avoided, and a service life of the ball retainer can be increased.

Detailed features and advantages of the present invention are described in detail in the following implementations, which are sufficient for any person skilled in the art to understand the technical content of the present invention and implement the operations accordingly. According to the content disclosed in this specification, the scope of patent application, and the drawings, any person skilled in the art can easily understand related objectives and advantages of the present invention.

DETAILED DESCRIPTION

Figure 1:
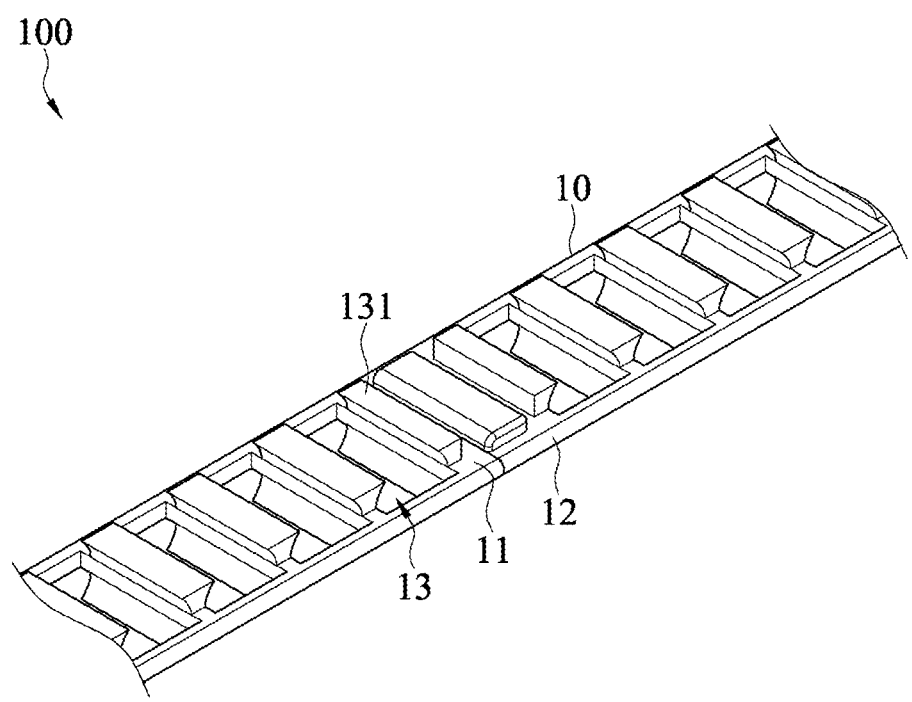
FIG. 1 is a partial schematic outside diagram of a ball retainer according to an embodiment of the present invention.
Figure 2:
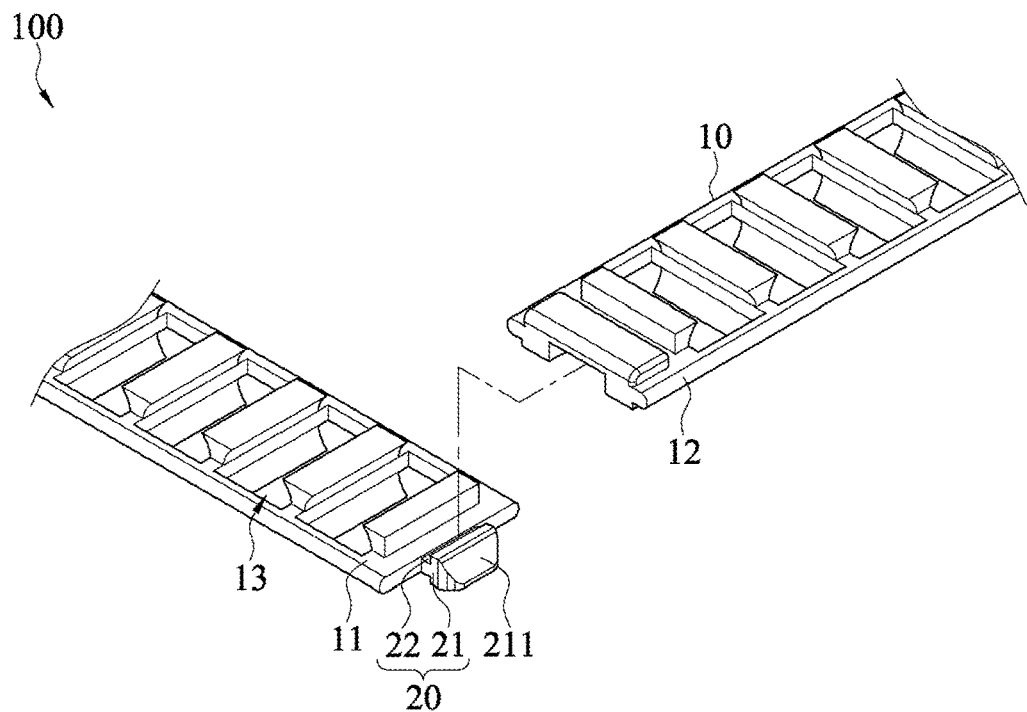
FIG. 2 is a partial enlarged schematic top exploded view of the ball retainer according to an embodiment of the present invention.
Figure 3:
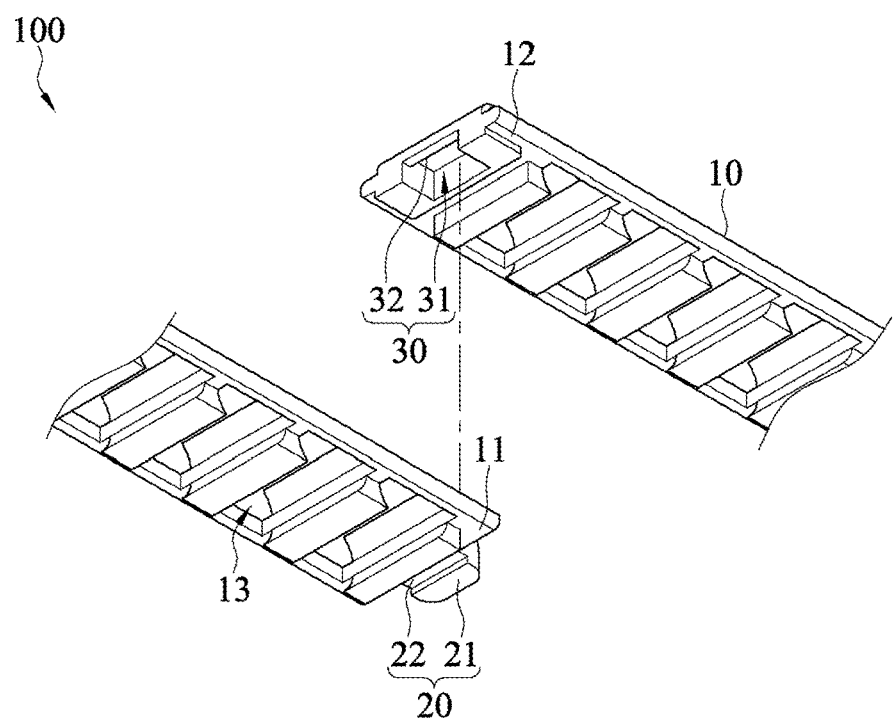
FIG. 3 is a partial enlarged schematic bottom exploded view of the ball retainer according to an embodiment of the present invention.
Figure 4:
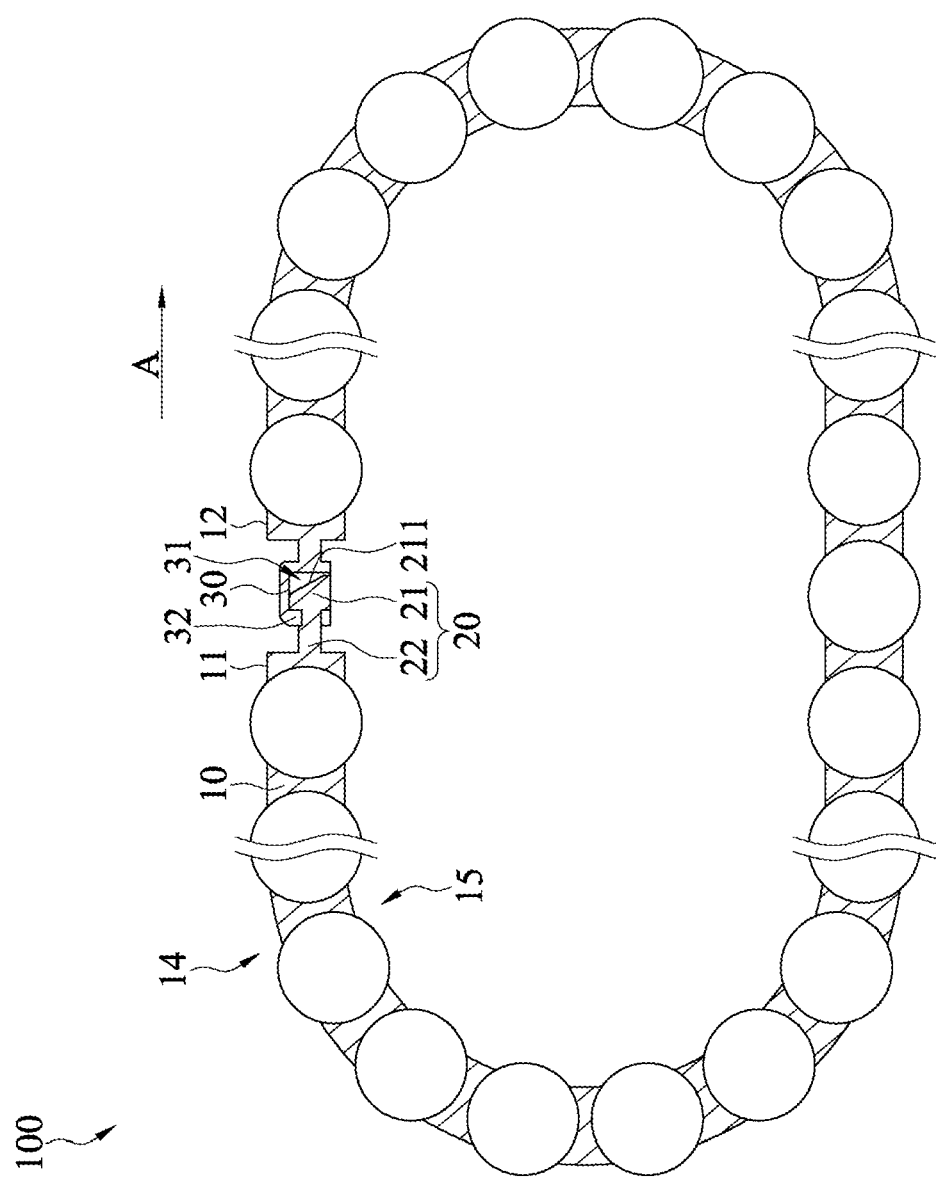
FIG. 4 is a partial cross-sectional view of actions of the ball retainer according to an embodiment of the present invention.
Figure 5:
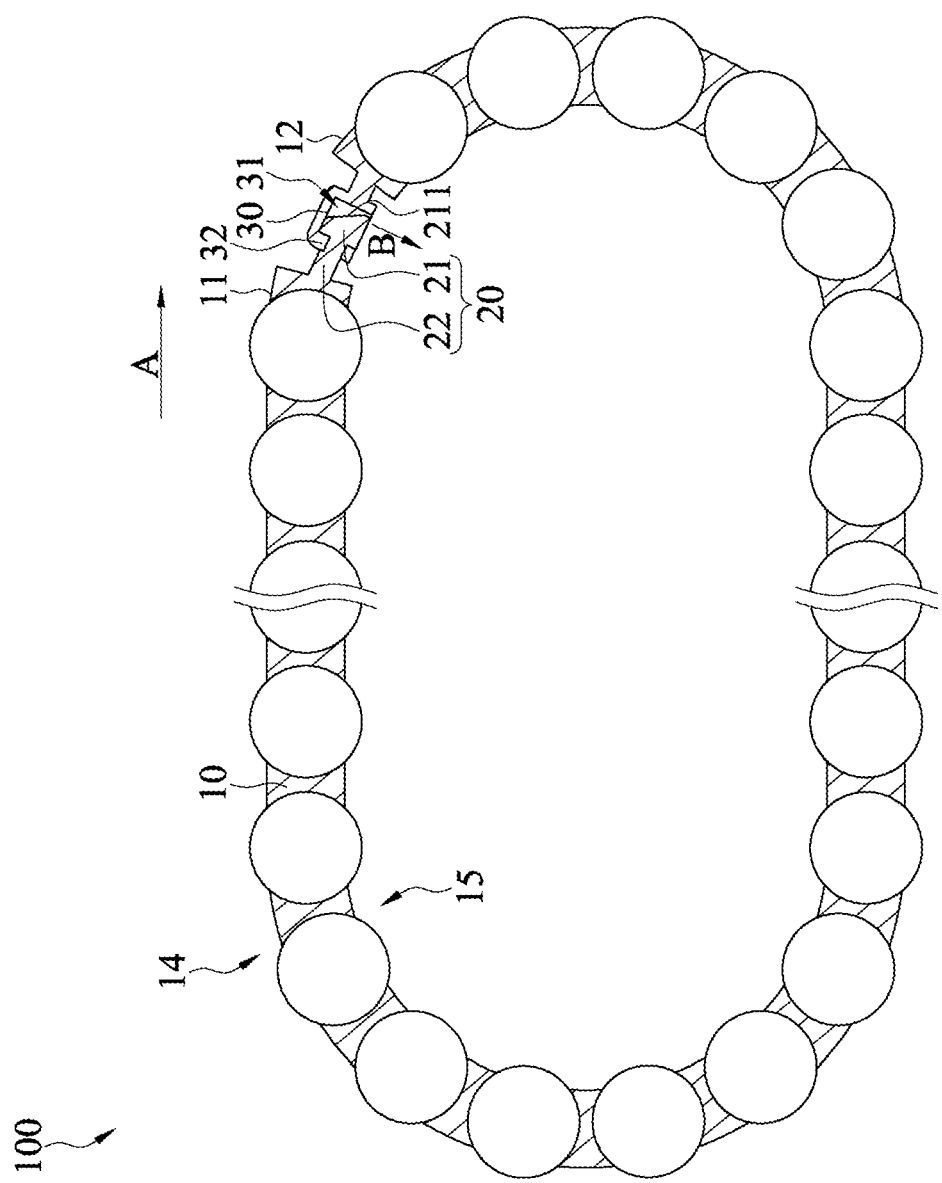
FIG. 5 is a partial schematic cross-sectional view of the ball retainer to which an acting force is applied according to an embodiment of the present invention.

FIG. 1 to FIG. 5 show a ball retainer according to an embodiment of the present invention. FIG. 1 is a partial schematic outside diagram of the ball retainer according to an embodiment of the present invention. FIG. 2 is a partial enlarged schematic top exploded view of the ball retainer according to an embodiment of the present invention. FIG. 3 is a partial enlarged schematic bottom exploded view of the ball retainer according to an embodiment of the present invention. FIG. 4 is a partial cross-sectional view of actions of the ball retainer according to an embodiment of the present invention. FIG. 5 is a partial schematic cross-sectional view of the ball retainer to which an acting force is applied according to an embodiment of the present invention. As shown in FIG. 2 and FIG. 3, a ball retainer 100 in this embodiment includes a chain belt 10, a hook portion 20, and a recess portion 30.

Referring to FIG. 1, the chain belt 10 has a first end 11 and a second end 12 respectively located at two opposite end portions and a plurality of accommodation portions 13 between the first end 11 and the second end 12. Each of the accommodation portions 13 is configured to accommodate a ball. The chain belt 10 in FIG. 1 is a partial illustration. In actual use, the accommodation portions 13 between the first end 11 and the second end 12 of the chain belt 10 are connected end to end to form a long string. For an actual overall structure, refer to FIG. 4 and FIG. 5.

The accommodation portion 13 of the chain belt 10 is configured to accommodate a ball. In this embodiment, the ball is a square ball, but it the present invention is not limited thereto. In some embodiments, the ball may be a round ball. As shown in FIG. 1, the accommodation portion 13 may clamp and fix the ball by using a stop portion 131 extending upward and downward, so as to maintain a proper distance among the balls, thereby avoiding excessive noise caused by continuous collision during operation.

Referring to FIG. 2 and FIG. 3 together, the hook portion 20 is disposed at the first end 11 of the chain belt 10, and the recess portion 30 is disposed at the second end 12 of the chain belt 10 corresponding to the hook portion 20. Referring to FIG. 2, FIG. 3, and FIG. 4 together, an outer circumferential side 14 and an inner circumferential side 15 are formed after the hook portion 20 of the ball retainer 100 of this embodiment is snapped into the recess portion 30. The hook portion 20 extends toward the outer circumferential side 14, and the recess portion 30 extends toward the inner circumferential side 15.

In this embodiment, the hook portion 20 extends toward the outer circumferential side 14, and the recess portion 30 extends toward the inner circumferential side 15, but the present invention is not limited thereto. In some embodiments, relative positions of the hook portion 20 and the recess portion 30 may be transposed, that is, the hook portion 20 extends toward the inner circumferential side 15, and the recess portion 30 extends toward the outer circumferential side 14. The side toward which the hook portion 20 extends herein means a direction in which a hook to be snapped into the recess portion 30 extends.

Specifically, as shown in FIG. 2, the hook portion 20 has a first connecting section 21 and a second connecting section 22. Two sides of the second connecting section 22 are respectively connected to the first end 11 of the chain belt 10 and the first connecting section 21. The first connecting section 21 extends upward as shown in FIG. 2 to protrude from an upper surface of the second connecting section 22, so as to form a hook structure that may be snapped into the recess portion 30. A side of the first connecting section 21 away from the second connecting section 22 has an inclined plane 211. By means of the inclined plane 211, engagement at the joint is easier. After the hook portion 20 and the recess portion 30 are disengaged from each other, when an acting force or an obstacle resulting in the disengagement is removed so that the hook portion 20 and the recess portion 30 approach each other to be snapped, the recess portion 30 may be pushed up along the inclined plane 211 to be snapped with the hook portion 20, for example. By means of the inclined plane 211, the hook portion 20 and the recess portion 30 can be more easily connected again since the disengagement.

Next, referring to FIG. 3 and FIG. 4 together, the recess portion 30 has a groove 31 and an abutting portion 32. After the hook portion 20 is snapped into the recess portion 30, the abutting portion 32 is correspondingly disposed above the second connecting section 22 of the hook portion 20 and abuts against the first connecting section 21. The first connecting section 21 is accommodated in the groove 31. Therefore, during operation, the abutting portion 32 of the recess portion 30 drives the first connecting section 21 accommodated in the groove 31.

Figure 6:
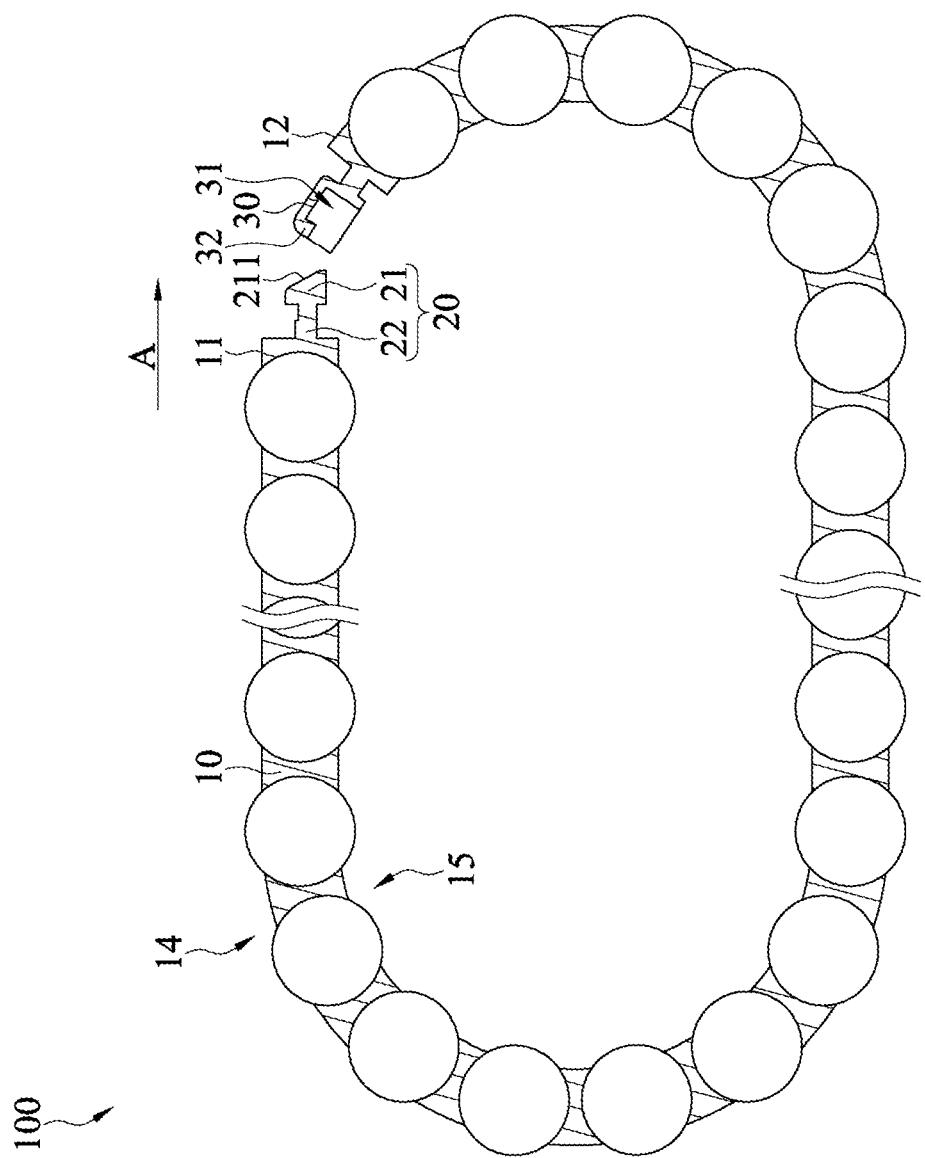
FIG. 6 is a partial schematic cross-sectional view of a hook portion and a recess portion of the ball retainer disengaged from each other according to an embodiment of the present invention.
Figure 7:
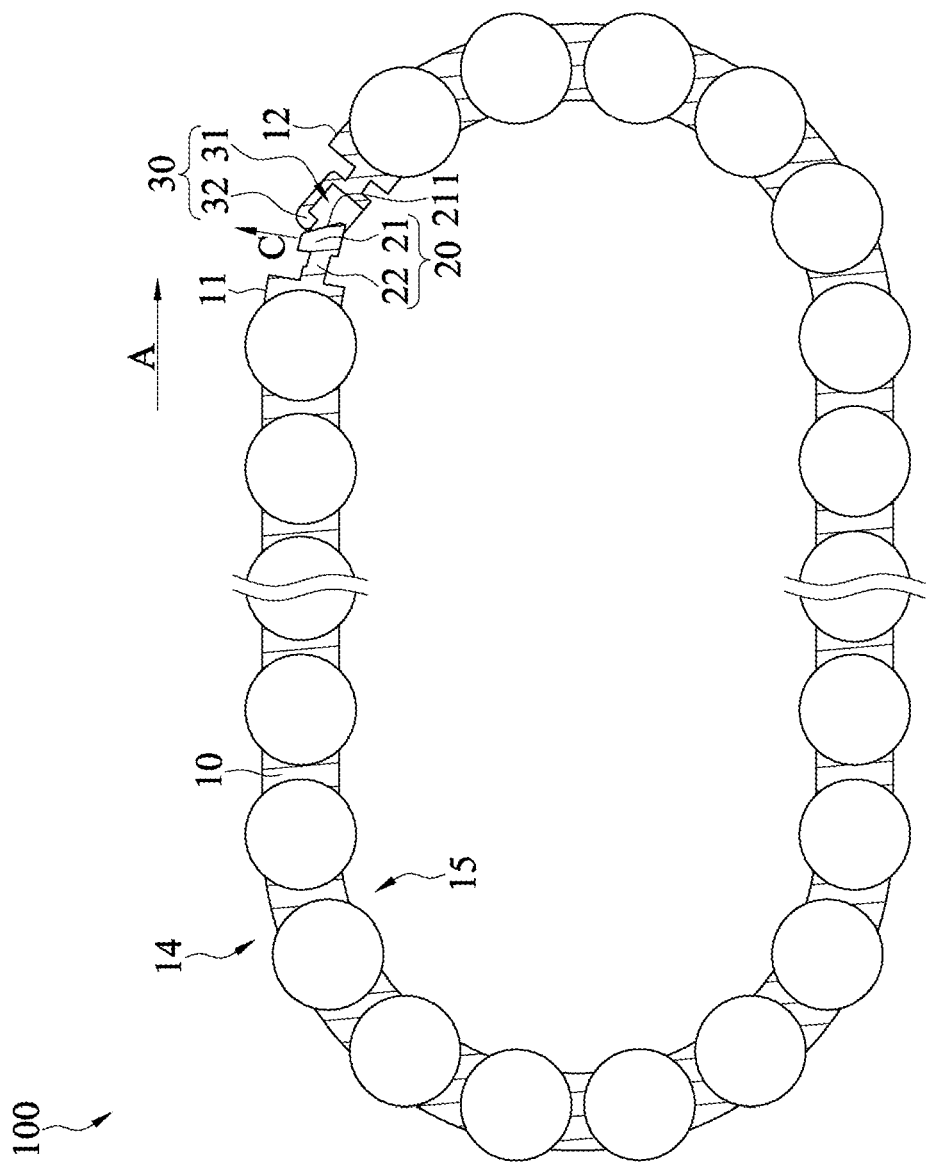
FIG. 7 is a partial schematic cross-sectional view of the hook portion and the recess portion of the ball retainer to be snapped with each other according to an embodiment of the present invention.

Referring to FIG. 6 to FIG. 7, FIG. 6 is a partial schematic cross-sectional view of a hook portion and a recess portion of the ball retainer disengaged from each other according to an embodiment of the present invention, and FIG. 7 is a partial schematic cross-sectional view of the hook portion and the recess portion of the ball retainer to be snapped with each other according to an embodiment of the present invention. It can be learned from FIG. 4 that, in actual use, the ball retainer 100 in this embodiment operates clockwise. A traveling direction is shown by an arrow A in FIG. 4. The recess portion 30 at the second end 12 of the chain belt 10 drives the hook portion 20 accommodated in the groove 31. The first connecting section 21 of the hook portion 20 is accommodated in the groove 31, and the abutting portion 32 of the recess portion 30 abuts against the first connecting section 21 located above the second connecting section 22. Next, various actions of disengagement between the hook portion 20 and the recess portion 30 are described.

Still referring to FIG. 5 to FIG. 7, in this embodiment, the second connecting section 22 of the hook portion 20 has an amount of elastic deformation. When an acting force is applied to the chain belt 10 so that the first end 11 and the second end 12 are moved away from each other after the hook portion 20 is snapped into the recess portion 30, the second connecting section 22 is elastically deformed, so that the hook portion 20 is disengaged from the recess portion 30. It can be learned from FIG. 5 that, when the recess portion 30 drives the hook portion 20 to operate in a device, for example, to travel clockwise in the direction shown by the arrow A, the chain belt 10 is pulled by an acting force when the hook portion travels to a turning point or travels slightly unsmoothly. However, since the hook portion 20 and the recess portion 30 are weakly connected with specific flexibility, when the acting force is applied to the chain belt 10, the second connecting section 22 of the hook portion 20 is elastically deformed and bend toward the inner circumferential side 15 (as shown by an arrow B in FIG. 5). In this way, the first connecting section 21 of the hook portion 20 is moved out of the groove 31 of the recess portion 30, and the hook portion 20 is completely disengaged from the recess portion 30, as shown in FIG. 6. It can be learned from FIG. 6 that, the hook portion 20 is free of the acting force after being disengaged from the recess portion 30. Therefore, the hook portion 20 can be restored from the deformation due to material characteristics, so that hook portion 20 and the recess portion 30 are not permanently deformed. Then the ball retainer 100 can still operate smoothly in the device without being affected by the foregoing acting force.

Next, it can be learned from FIG. 7 that, when the acting force or the obstacle resulting in the disengagement disappears, during the continuous operation of the ball retainer 100, the first end 11 and the second end 12 of the chain belt 10 approach each other, until the hook portion 20 is about to be snapped into the recess portion 30. The hook portion 20 approaches the abutting portion 32 at a front end of the recess portion 30, and is elastically deformed at the second connecting section 22 under the action of the inclined plane 211. When the first connecting section 21 is completely accommodated in the groove 31, the hook portion is restored again to the status shown in FIG. 5 by virtue of the elastic restoring force (shown by an arrow C in FIG. 7) of the material, so that the hook portion 20 is accordingly snapped into the recess portion 30, and the ball retainer 100 continues operating after restoring to the snapped status.

In some other implementations, the hook portion 20 may have an amount of elastic deformation as a whole. When an acting force is applied to the chain belt 10 so that the first end 11 and the second end 12 are moved away from each other, a portion of the hook portion 20 bearing a greater acting force is elastically deformed, so that the hook portion 20 is disengaged from the recess portion 30. More specifically, when the ball retainer 100 of this embodiment operates to a turning point or operates slightly unsmoothly in the device, the hook portion 20 and the recess portion 30 are pulled by an acting force. Since the hook portion 20 has a specific amount of elastic deformation, the hook portion 20 is elastically deformed and bends toward the inner circumferential side 15, so that the first connecting section 21 of the hook portion 20 is moved out of the groove 31 of the recess portion 30. In this way, the hook portion 20 is deformed to be disengaged from the recess portion 30, so as to prevent the hook portion 20 and the recess portion 30 from being permanently deformed or even cracked as a result of being continuously pulled. The hook portion 20 is free of any acting force after being disengaged from the recess portion 30. Therefore, the hook portion 20 can be restored from the deformation due to material characteristics, so that the hook portion 20 is not permanently deformed. Then the ball retainer 100 can still operate smoothly in the device without being affected by the foregoing acting force. Snapping the hook portion 20 into the recess portion 30 after subsequent continuous operation is the same that described above, and therefore details are not described herein again.

In some still other implementations, a joint between the recess portion 30 and the chain belt 10 may have an amount of elastic deformation. When an acting force is applied to the chain belt 10 so that the first end 11 and the second end 12 are moved away from each other, the joint between the recess portion 30 and the chain belt 10 is elastically deformed, so that the hook portion 20 is disengaged from the recess portion 30. More specifically, when the ball retainer 100 of this embodiment operates to a turning point or operates slightly unsmoothly in the device, the hook portion 20 and the recess portion 30 are pulled by an acting force. Since the joint between the recess portion 30 and the chain belt 10 has a specific amount of elastic deformation, the joint between the recess portion 30 and the chain belt 10 is elastically deformed and bends toward the outer circumferential side 14, so that the first connecting section 21 of the hook portion 20 is disengaged from the groove 31 of the recess portion 30. In this way, the joint between the recess portion 30 and the chain belt 10 is deformed to be disengaged from the recess portion 30, so as to prevent the hook portion 20 and the recess portion 30 from being permanently deformed or even cracked as a result of being continuously pulled. After the hook portion 20 is disengaged from the recess portion 30, the joint between the recess portion 30 and the chain belt 10 is restored from the deformation due to the material characteristics without being affected by any acting force, so that the joint between the recess portion 30 and the chain belt 10 is not permanently deformed. Then the ball retainer 100 can still operate smoothly in the device without being affected by the foregoing acting force. Snapping the hook portion 20 into the recess portion 30 after subsequent continuous operation is the same that described above. The joint between the recess portion 30 and the chain belt 10 is deformed again, so that the hook portion 20 is snapped into the recess portion 30 again.

It can be learned that, according to the ball retainer 100 in this embodiment, by means of the hook portion 20 and the recess portion 30 disposed at the ends, the end-to-end connection of the chain belt 10 is achieved. The hook portion 20 at the first end 11 hooks the recess portion 30 at the second end 12, and the hook portion 20 and the recess portion 30 are weakly connected. Therefore, when the transmission element travels through the circular turning point or travels slightly unsmoothly in the device, the hook portion 20 and the recess portion 30 disposed at the two ends of the chain belt 10 are disengaged from each other, which can not only prevent the hook portion 20 and the recess portion 30 from cracking at the joint with the chain belt 10, but also improve flexibility of the joint. In addition, when the transmission element operates smoothly since the disengagement, the hook portion 20 may be snapped into the recess portion 30 again to restore to an initial connection status, so as to drive the whole ball retainer 100 to operate smoothly. In this way, an overall load capacity can be improved, damage caused by an excessive acting force or obstruction can be avoided, unsmooth operation that may occur at a turning point can also be avoided, and a service life of the ball retainer 100 can be increased.

In actual use, a length of a circulation channel in the device and a size of the ball retainer 100 may be calculated to match each other according to requirements of a user. When the ball retainer operates to a turning point or encounters a foreign matter in the channel, the hook portion 20 and the recess portion 30 disposed at the two ends of the chain belt 10 may be slightly disengaged from each other. After the chain belt 10 of the ball retainer 100 automatically adjusts to a smooth status in the channel, the structures disposed at the ends automatically restore to the status in which the hook portion 20 and the recess portion 30 are snapped with each other. In addition, the first connecting section 21 of the hook portion 20 has an inclined plane 211. After the hook portion 20 and the recess portion 30 are disengaged from each other, when an acting force or an obstacle resulting in the disengagement is removed so that the hook portion 20 and the recess portion 30 approach each other to be snapped, the recess portion 30 is snapped with the hook portion 20 along the inclined plane 211. Therefore, by means of the inclined plane 211, the hook portion 20 and the recess portion 30 can be more easily connected again since the disengagement.

In addition, it can be learned from FIG. 2 and FIG. 3 that, according to the ball retainer 100 in this embodiment, a width of the hook portion 20 is approximately equal to a width of the recess portion 30. Therefore, when the hook portion 20 is snapped into the recess portion 30, the hook portion 20 can be completely accommodated in the recess portion 30.

Since the ball retainer 100 in this embodiment is made of plastic, the hook portion 20 and the recess portion 30 have a specific amount of elastic deformation. During operation in the device, when the chain belt 10 is pulled by an acting force, the second connecting section 22 of the hook portion 20 and the joint between the hook portion 20 or the recess portion 30 and the chain belt 10 can be elastically deformed simultaneously or individually, so that the hook portion 20 is disengaged from the recess portion 30, and the ball retainer 100 can continue operating in the device.

The ball retainer 100 in this embodiment is made of plastic, but the present invention is not limited thereto. In some embodiments, the ball retainer 100 may be made of other materials that can provide a specific amount of elastic deformation.

Figure 8:
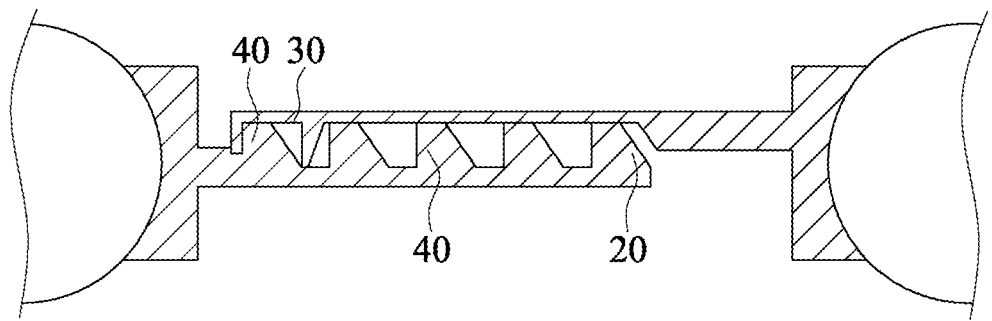
FIG. 8 is a partial enlarged schematic view of a ball retainer according to another embodiment of the present invention.
Figure 9:
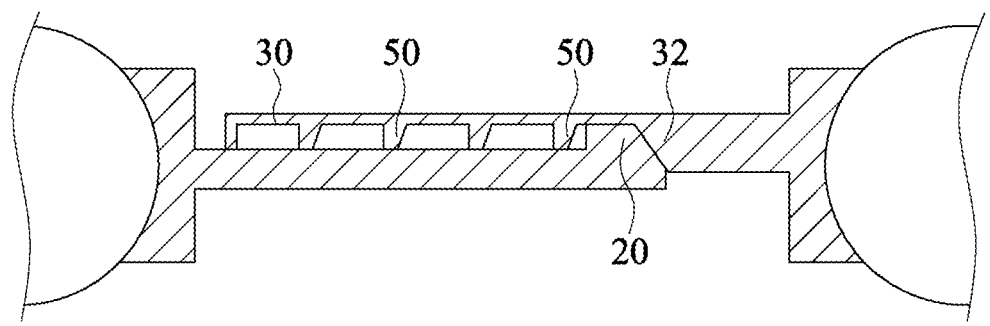
FIG. 9 is a partial enlarged schematic view of a ball retainer according to still another embodiment of the present invention.

Next, referring to FIG. 8 to FIG. 9, FIG. 8 is a partial enlarged schematic view of a ball retainer according to another embodiment of the present invention, and FIG. 9 is a partial enlarged schematic view of a ball retainer according to still another embodiment of the present invention. In the two embodiments, parts corresponding to those in the previous embodiment are named with the same element symbols, and corresponding structures and connection relationships are not be repeated. It can be learned from FIG. 8 that a ball retainer 100 according to another embodiment of the present invention further includes a plurality of hook portions, which are named as first hook portions 40 below for ease of description. In FIG. 8, four first hook portions 40 are exemplified, but the number may be set as required, and the present invention is not limited thereto. The first hook portions 40 are all disposed between the hook portion 20 and the first end 11 of the chain belt 10. One of the plurality of first hook portions 40 and the hook portion 20 is snapped into the recess portion 30. In this way, the hook portion 20 or the plurality of first hook portions 40 and the recess portion 30 can also approach each other to be snapped with each other after the acting force or the obstacle resulting in the disengagement is removed. By means of the hook portion 20 and the plurality of first hook portions 40, even if the chain belt 10 is disengaged from a first one of the first hook portions 40 during use, the plurality of subsequent first hook portions 40 and the last hook portion 20 can provide a snapping function to avoid instantaneous complete disengagement, thereby ensuring smooth operation in the device. In addition, according to a length of a corresponding rolling channel, a required length may be adjusted for snapping during mounting for slide rails of different sizes.

Next, referring to FIG. 9, which shows still another embodiment of a ball retainer 100 according to the present invention. The ball retainer further includes a plurality of recess portions, which are named as first recess portions 50 for ease of description. The first recess portions 50 are disposed between the recess portion 30 and the second end 12 of the chain belt 10. The hook portion 20 is snapped into one of the plurality of first recess portions 50 and the recess portion 30. In this way, the hook portion 20 and the recess portion 30 or the first recess portions 50 can also approach each other to be snapped with each other after the acting force or the obstacle resulting in the disengagement is removed. By means of the recess portion 30 and the first recess portions 50, even if the chain belt 10 is disengaged from a first one of the first recess portions 50 during use, the plurality of subsequent first recess portions 50 and the last recess portion 30 can provide a snapping function to avoid instantaneous complete disengagement, thereby ensuring smooth operation in the device. In addition, according to a length of a corresponding rolling channel, a required length may be adjusted for snapping during mounting for slide rails of different sizes.

In some embodiments, the ball retainer 100 may also include both the first hook portion 40 and the first recess portion 50. A number of first recess portions 50 correspondingly increases with an increase of a number of first hook portions 40, which can improve a connecting ability between the ends of the chain belt 10.

In conclusion, according to the ball retainer 100 provided in the present invention, by means of the hook-like structure disposed at the end of the chain belt 10, the hook portion 20 is disengaged from the recess portion 30 at a circular turning point or a place where the traveling is slightly unsmooth, which can not only prevent the hook portion 20 and the recess portion 30 from cracking at the joint with the chain belt 10, but also improve flexibility of the joint. In addition, if the acting force or the obstacle is removed since after the disengagement and the ball retainer 100 continues operating, the hook portion 20 may be snapped into the recess portion 30 again to restore to an initial connection status, so as to drive the whole ball retainer 100 to operate smoothly. In this way, an overall load capacity can be improved, damage caused by an excessive acting force or obstruction can be avoided, unsmooth operation that may occur at a turning point can also be avoided, and a service life of the ball retainer 100 can be increased.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:
1. A ball retainer, comprising:
 a chain belt, having a first end and a second end respectively located at two opposite end portions and a plurality of accommodation portions between the first end and the second end, wherein each of the accommodation portions is configured to accommodate a ball;
 a hook portion, disposed at the first end of the chain belt; and a recess portion, disposed at the second end of the chain belt corresponding to the hook portion; wherein an outer circumferential side and an inner circumferential side are formed after the hook portion of the ball retainer is snapped into the recess portion, wherein the hook portion extends toward the outer circumferential side, and the recess portion extends toward the inner circumferential side; when an acting force is applied to the chain belt during operation of the ball retainer such that the first end and the second end are moved away from each other after the hook portion is snapped into the recess portion, the hook portion is disengaged from the recess portion; and during operation of the ball retainer after the acting force disappears, the first end and the second end of the chain belt approach each other so that the hook portion is accordingly snapped into the recess portion.

2. The ball retainer according to claim 1, wherein the recess portion has a groove and an abutting portion, the hook portion has a first connecting section and a second connecting section, after the hook portion is snapped into the recess portion, the abutting portion is correspondingly disposed on the outer circumferential side of the second connecting section of the hook portion and abuts against the first connecting section, and the first connecting section is accommodated in the groove.

3. The ball retainer according to claim 2, wherein the second connecting section connects the first end of the chain belt to the first connecting section, and a side of the first connecting section away from the second connecting section has an inclined plane.

4. The ball retainer according to claim 3, wherein the second connecting section has an amount of elastic deformation, and when an acting force is applied to the chain belt so that the first end and the second end are moved away from each other after the hook portion is snapped into the recess portion, the second connecting section is elastically deformed, so that the hook portion is disengaged from the recess portion.

5. The ball retainer according to claim 1, wherein the hook portion has a first connecting section and a second connecting section, the second connecting section connects the first end of the chain belt to the first connecting section, and a side of the first connecting section away from the second connecting section has an inclined plane.

6. The ball retainer according to claim 1, wherein the hook portion is deformed to be disengaged from the recess portion.

7. The ball retainer according to claim 1, wherein a joint between the recess portion and the chain belt is deformed, so that the hook portion is disengaged from the recess portion.

8. The ball retainer according to claim 1, further comprising a plurality of additional hook portions disposed between the hook portion and the first end of the chain belt, wherein one of the additional hook portions and the hook portion is snapped into the recess portion.

9. The ball retainer according to claim 1, further comprising a plurality of additional recess portions disposed between the recess portion and the second end of the chain belt, wherein the hook portion is snapped into the recess portion or one of the additional recess portions.

10. The ball retainer according to claim 1, wherein the ball retainer is made of plastic.

\* \* \* \* \*